United States Patent Office 3,492,937
Patented Feb. 3, 1970

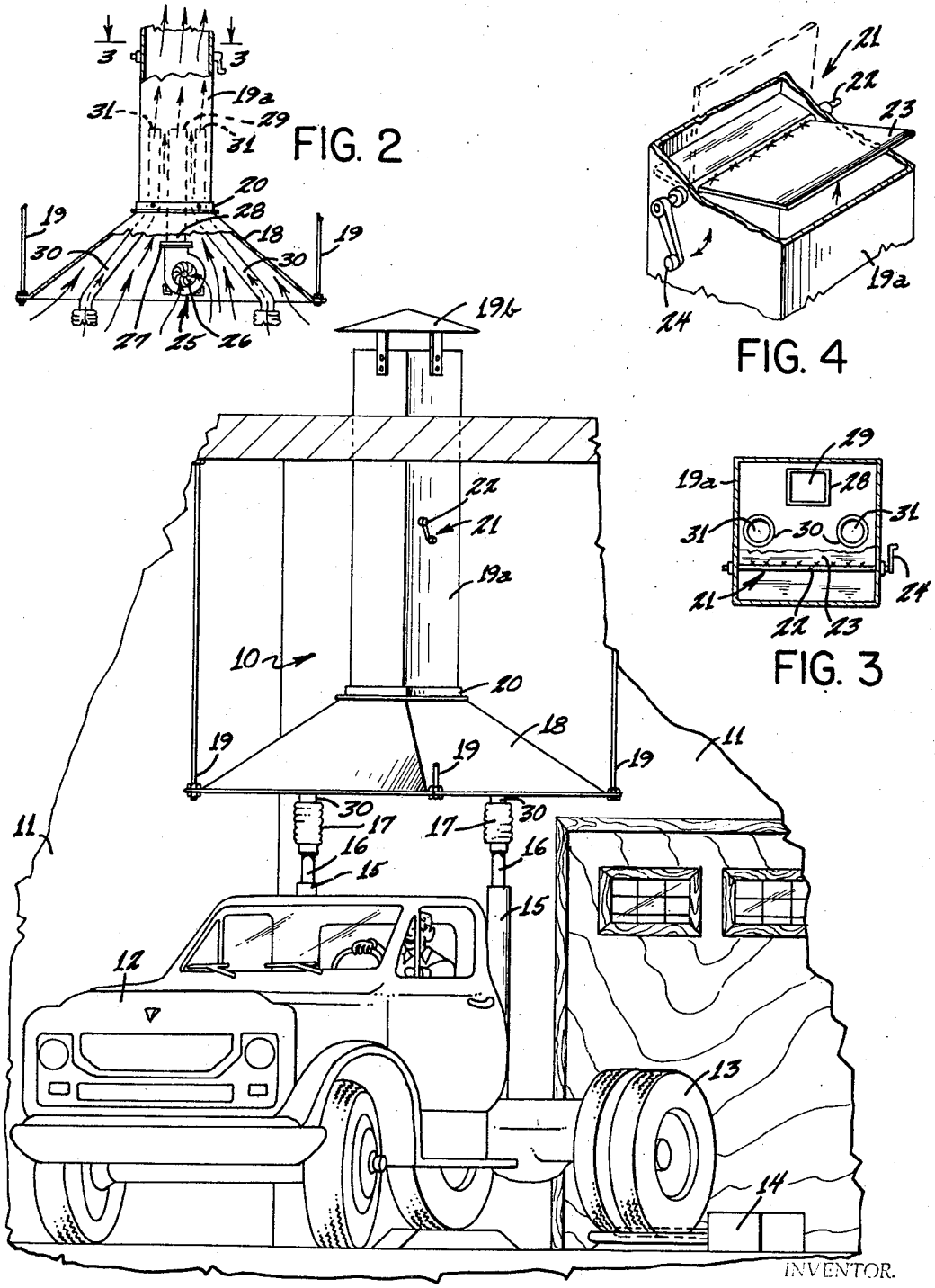

3,492,937
APPARATUS FOR REMOVING CONTAMINATED AIR AND EXHAUST FUMES FROM A GARAGE
Andrew Ambli, 2376 N. Hamline Ave.,
St. Paul, Minn. 55113
Filed May 13, 1968, Ser. No. 728,598
Int. Cl. F23j *11/02;* F24f *7/06, 13/02*
U.S. Cl. 98—43                                5 Claims

ABSTRACT OF THE DISCLOSURE

An exhaust removing device especially adapted for removing internal combustion engine exhaust fumes from the inside of a building. An exhaust stack is mounted adjacent the ceiling of the building and has a draft inducing fan mounted centrally of the stack. Exhaust pipe extension ducts are mounted within the stack and adjacent the fan outlet so that the exhaust fumes from the exhaust pipe are removed from the building.

---

This invention relates to an apparatus for simultaneously removing contaminated air from a garage and exhaust fumes from an internal combustion engine operating in the garage and urging the contaminated air and exhaust fumes into the outside atmosphere.

In the repair of automobiles, trucks, diesel engines and other internal combustion engines, the engine being repaired is typically repaired indoors, and must be tested upon completion of the repair and tuneup. In some instances, a dynamometer is utilized to measure the mechanical power of the repaired and tuned engine. In fact, some repair garages have a "dynamometer room" in which the repaired and tuned engine is operated under load with the dynamometer attached thereto. The engine operating under the load creates a high degree of exhaust fumes which must be exhausted from the room to the outside atmosphere to maintain safe working conditions.

Exhaust fans and vacuum systems have heretofore been used in dynamometer rooms and garages in the past to exhaust the contaminated garage air and the exhaust fumes from engines operating within the room. It has been found however, that exhaust fans as heretofore used, had a short life due to the damaging effect of the hot exhaust fumes from an engine operating under load passing through the fan and contacting the fan blades. In some instances, where the exhaust fan was located outside of the garage and surrounded by the outside atmosphere, the fan was still affected and damaged by the passage of the exhaust gases therethrough. The location of the fan outside of the garage to pull gases upwardly necessitated a large fan and corresponding high horsepower motor to drive the fan.

With these comments in mind, it is to the elimination of these and other disadvantages to which the present invention is directed along with the inclusion therein of other novel and desirable features.

An object of my invention is to provide a new and improved apparatus of simple and inexpensive construction and operation for removing contaminated air from the dynamometer room of a garage and exhaust fumes from an internal combustion engine operating in the dynamometer room.

Another object of my invention is to provide an improved apparatus for simultaneously removing contaminated air from a garage and drawing exhaust fumes from an internal combustion engine operating within the garage and to exhaust the contaminated air and exhaust fumes into the exterior atmosphere.

Still another object of my invention is to provide an improved apparatus for removing contaminated air from a garage and exhaust fumes from internal combustion engine operating in the garage which apparatus utilizes an exhaust fan which urges hot internal combustion engine exhaust fumes into the atmosphere without contacting the damaging hot exhaust fumes and thereby greatly increasing the life of the fan.

A further object of this invention is to provide an improved apparatus for removing contaminated air from a garage and exhaust fumes from an internal combustion engine operating within the garage, which apparatus includes a normally closed damper interposed between the garage and the atmosphere and is actuated by exhaust fumes and contaminated air whereby the damper is open to the atmosphere at such times as contaminated air and exhaust fumes are being urged from the garage by the fan, and is closed at such times as the fan is inactive.

These and other objects and advantages of my invention will more fully appear from the following description made in connection with the accompanying drawings wherein like reference characters refer to the same or similar parts throughout the several views, and in which:

FIG. 1 is a diagrammatic view showing a typical usage of my apparatus for removing contaminated air from a garage and exhaust fumes from an internal combustion engine;

FIG. 2 is a partial view of my apparatus for removing contaminated air from a garage and exhaust fumes from an internal combustion engine operating in the garage with portions broken away for clarity;

FIG. 3 is a sectional view taken along the line 3—3 of FIG. 2; and

FIG. 4 is an enlarged partial perspective view of the damper arrangement of my invention.

One form of the present invention is shown in the drawings and is described herein.

The apparatus for removing contaminated air from a garage and exhaust fumes from an engine operating in the garage is indicated, in general, by numeral 10 and is shown in FIG. 1 in a typical usage. Apparatus 10 is installed in garage or dynamometer room 11 which is completely enclosed. Therefore means must be provided for exhausting the fumes generated by engines which are run under load and tested in room 11. A diesel tractor is indicated at 12 with the rear tractor wheels 13 thereof mounted on a dynamometer 14 to test the mechanical power of the diesel engine of tractor 12. Tractor 12 is run under load with the exhaust fumes from the engine exhausted through the pair of mufflers 15 and pair of tail pipes 16 and then into the flexible connecting elements 17. The flexible connecting elements 17 are typically asbestos sleeves compressed or folded in accordion fashion to provide added flexibility thereto.

My apparatus for removing contaminated air and exhaust fumes from a garage includes a hood 18 supported by hangers 19 positioned at each corner of the rectangularly shaped hood. The hood may be constructed from sheet metal of suitable gage and is formed to converge upwardly to a square opening at which opening stack 19a is connected. Stack 19a includes exterior protective cover 19b attached thereto. The connecting collar is indicated at 20. The hood is of sufficient size to cover the general area of operation of tractor 12 which is being tested, and converges to a 30 inch by 30 inch square opening for stack 19a. Stack 19a is also constructed of sheet metal of suitable gage, and is of dimensions corresponding to the opening of hood 18. Of course, the proportions and dimensions stated herein are intended to be illustrative only and not to limit the invention thereto.

A damper, indicated, in general, by numeral 21 is interposed in stack 19a and is rotatably mounted for rotation about axis 22 which is transverse to the direction of flow of contaminated air and exhaust fumes through stack 19a. Damper 21 includes a damper plate 23 affixed, as by welding to axis 22 and a counterbalance 24 affixed to axis 22 positioning damper plate 23 in a normally closed position. Damper 21 is actuated by the flow of gases upwardly as urged by fan 25, which air flow overcomes the effect of counterweight 24X thereby opening the stack to the atmosphere.

A fan is mounted under hood 18 and is indicated, in general, by numeral 25. Fan 25 has a capacity on the order of 2,000 c.f.m. and is driven by a motor of suitable horsepower. The fan includes an air inlet side 26 and an outlet or pressure side 27 to which a fan duct 28 is connected. Fan duct 28 is constructed of sheet metal of suitable gage and is square, having dimensions of 9 inches by 9 inches. Fan duct 28 projects upwardly into stack 19a and is axially aligned therewith. Fan duct 28 exhausts contaminated air into stack 19a at fan duct outlet 29. A pair of exhaust pipe extension ducts 30 conduct exhaust from the pair of tail pipes 16 upwardly into stack 19a. Extension ducts 30 are axially aligned with stack 19a and project the exhaust fumes upwardly into stack 19a. The pair of exhaust pipe extension ducts includes openings 31 which are substantially co-planar with opening 29 of fan duct 28. The exhaust pipe extension ducts are constructed of circular metal tubing material and are typically five inches in diameter.

As shown in FIG. 3, the exhaust pipe extension ducts are positioned 30 in stack 19a in opposed relation along opposite stack walls with fan duct 28 therebetween along a third stack wall.

The operation of my apparatus for removing contaminated air from a garage and exhaust fumes from an internal combustion engine, operating under load in the garage, may be described by reference to FIG. 2. The flow of contaminated air from the garage and the flow of exhaust fumes from tractor 12 operating under load in room 11 is shown by the air flow arrows. When fan 25 is started, air is drawn into the inlet side 26 of the fan and is exhausted, under pressure, through pressure side or outlet 27 of the fan into fan duct 28. The air within duct 28 is then driven at a high velocity by fan 25 into duct 19a through opening 29 in duct 28. The action of the air stream opens damper assembly 21 by overcoming counterweight 24 which maintains the damper in a normally closed position. The rapidly moving air stream of contaminated air from duct 28 then flows upwardly and outwardly of stack 19a providing a draw or draft within the stack. The draft which is thereby created in the stack draws peripheral contaminated air surrounding the tractor 12 into hood 18 and then into the stack, upwardly around exhaust pipe extension ducts 30 and fan duct 28, through stack 19a and into contact with the rapidly moving air stream in duct 19a at outlet 29 of fan duct 28. The peripheral contaminated air contacts this rapidly moving air stream and is drawn therewith and urged into the exterior atmosphere thereby.

The exhaust fumes from tractor 12 operating under load in dynamometer room 11 are conducted by flexible connecting elements 17 which join tractor tail pipes 16 to exhaust pipe extension ducts 30 thereby conducting the exhaust fumes into stack 19a. The exhaust fumes are exhausted at openings 31 in exhaust pipe extension ducts 30 which are at the same level as opening 29 in fan duct 28. The exhaust fumes contact the rapidly moving air stream exhausted from fan duct 28 and are drawn therewith and exhausted into the atmosphere thereby. The draft which is created in stack 19a by the rapidly moving air stream from fan duct 28 aids in efficiently urging the exhaust fumes from extension duct 30 into the atmosphere. Since the exhaust fumes from the engine are efficiently exhausted, the operation of the engine approximates normal operating conditions and safe working conditions are maintained in the garage at all times.

It should be noted that some installations may require a bend in the stack and possibly corresponding bends in the fan duct and extension ducts to accommodate building characteristics. This arrangement, of course, is within the scope of my invention.

From the foregoing it will be seen that I have provided a new and novel apparatus for removing contaminated air from a garage and exhaust fumes from an internal combustion engine, operating under load in the garage. My apparatus is of simple and inexpensive construction and operation and does not require a large fan nor a large fan drive motor in that the gases are pushed rather than pulled through the stack to the exterior atmosphere. Further, the damaging hot exhaust fumes do not pass through the fan and, in fact, do not even flow around or near the fan. Yet, I have found that my apparatus is extremely efficient in that it will maintain safe working conditions in a garage, particularly the dynamometer room of a garage in which engines are operated under load thereby exhausting a large amount of exhaust fumes. It should be noted that my apparatus provides for use of a smaller fan and motor with corresponding operational economics, as well as increasing fan life as compared to exhaust equipment heretofore available.

It will, of course, be understood that various changes may be made in the form, details, arrangement and proportions of the various parts of the invention without departing from the scope of my invention.

What is claimed is:

1. An apparatus for simultaneously removing contaminated air from a garage and exhaust fumes from an internal combustion engine having an exhaust pipe and operating in the garage, said apparatus comprising
  a stack for conducting exhaust fumes from the internal combustion engine and contaminated air from the garage into the exterior atmosphere,
  a fan duct substantially smaller than the stack and projecting into said stack to conduct contaminated garage air into said stack,
  a fan adjacent the stack having an air inlet side and a pressure side, said pressure side affixed to said fan duct whereby contaminated garage air is received in the air inlet side of said fan and propelled at high velocity from the pressure side of said fan into said fan duct and exhausted into said stack thereby creating a rapidly moving air stream in said stack providing a draft therein,
  an exhaust pipe extension duct substantially smaller than the stack and connected to the exhaust pipe of the internal combustion engine and projecting into said stack alongside said fan duct, the flow area within the stack substantially exceeding the size of the extension duct and the fan duct to permit free flow of air outwardly through the stack, said extension duct conducting exhaust fumes from the internal combustion engine into said stack and exhausting the exhaust fumes alongside the outlet of said fan duct and at least even therewith whereby the exhaust fumes exhausted from said exhaust pipe extension duct into said stack having a draft therein and into contact with the rapidly moving air stream exhausted from said fan duct are carried and exhausted into the exterior atmosphere through said stack.

2. The apparatus of claim 1 wherein the internal combustion engine from which exhaust fumes must be conducted includes a pair of exhaust pipes and including a pair of exhaust pipe extension ducts connected to the pair of internal combustion engine exhaust pipes, each of said pair of exhaust pipe extension ducts projecting into said stack alongside said fan duct.

3. The apparatus of claim 1 including a hood affixed to said stack positioned above the internal combustion engine operating in the garage and surrounding said fan.

4. The apparatus of claim 1 wherein the opening of said exhaust pipe extension duct is above the opening of said fan duct in said stack.

5. The apparatus of claim 1 including a damper interposed in said stack above the outlet of said fan duct and said exhaust pipe extension duct, said damper having a normally closed position and rotatably mounted in said stack for movement between the closed position and an open position, said damper opened by the action of the exhaust fumes and contaminated air urged through said stack by said fan whereby said damper is rotated to the open position allowing the exhaust fumes and contaminated air to flow through said stack to the exterior atmosphere.

References Cited

UNITED STATES PATENTS

| | | | |
|---|---|---|---|
| 23,825 | 5/1859 | Clayton | 98—115 X |
| 1,165,957 | 12/1915 | Filkins | 98—115 X |
| 1,725,834 | 8/1929 | Sinkes | 104—52 |
| 1,866,627 | 7/1932 | Day et al. | 104—52 |
| 3,200,765 | 8/1965 | Ambli | 98—43 X |

WILLIAM E. WAYNER, Primary Examiner

U.S. Cl. X.R.

98—115; 104—52